United States Patent [19]

Henz et al.

[11] Patent Number: 4,758,347

[45] Date of Patent: Jul. 19, 1988

[54] PROCESS FOR PURIFYING DYEING WASTEWATERS

[75] Inventors: Alfred Henz, Reinach; Heinz Pfenninger, Lupsingen, both of Switzerland

[73] Assignee: Ciba-Geigy Corporation, Ardsley, N.Y.

[21] Appl. No.: 8,817

[22] Filed: Jan. 30, 1987

[30] Foreign Application Priority Data

Feb. 7, 1986 [CH] Switzerland ............................ 483/86

[51] Int. Cl.$^4$ .......................... B01D 13/00; C02F 1/44
[52] U.S. Cl. .................................... 210/639; 210/654; 210/655; 210/917
[58] Field of Search ............... 210/639, 652, 654, 655, 210/917

[56] References Cited

U.S. PATENT DOCUMENTS

| | | | |
|---|---|---|---|
| B 524,806 | 3/1976 | Ladha et al. | 210/234 |
| 3,758,405 | 9/1973 | Fremont | 210/23 |
| 3,836,457 | 9/1974 | Gross et al. | 210/196 |
| 4,046,686 | 9/1977 | Goldstein | 210/638 |
| 4,200,526 | 4/1980 | Johnson et al. | 210/639 |
| 4,226,673 | 10/1980 | Fremont | 162/29 |
| 4,247,401 | 1/1981 | Bloch et al. | 210/638 |
| 4,477,634 | 10/1984 | Linder et al. | 210/767 |
| 4,584,103 | 4/1986 | Linder et al. | 210/650 |
| 4,604,204 | 8/1986 | Linder et al. | 210/490 |

FOREIGN PATENT DOCUMENTS

| | | | |
|---|---|---|---|
| 0047953 | 9/1981 | European Pat. Off. | 210/639 |
| 0061424 | 3/1982 | European Pat. Off. | 210/639 |
| 0114286 | 12/1983 | European Pat. Off. | 210/639 |
| 0082355 | 6/1986 | European Pat. Off. | 210/639 |
| 2046055 | 4/1971 | Fed. Rep. of Germany | 210/639 |
| 2347329 | 4/1975 | Fed. Rep. of Germany | 210/639 |
| 2711072 | 9/1977 | Fed. Rep. of Germany | 210/639 |
| 3116942 | 11/1982 | Fed. Rep. of Germany | 210/639 |
| 2000695 | 1/1979 | United Kingdom | 210/639 |

OTHER PUBLICATIONS

Search Report, EP 87 81 0066.
40-Textiles, vol. 98 (1983), p. 55501, 98:55494t, "Installation for Treating Hot Textile Wastewaters".
Chemical Abstracts-vol. 83 (1975), p. 346, 84503r, "Treatment of Waste Water from Textile Finishing".
Journal of the Water Pollution Control Federation, vol. 44, No. 8, Aug. 1972-pp. 1545-1551, Aurich et al, Treatment of Textile Dyeing Wastes.
Chemical Abstracts, vol. 75 (1971)-7726y Concentration of Sugar-Containing Solutions.
Lacey, Robert et al., *Industrial Processing with Membranes*, Wiley-Interscience, N.Y., 1972, pp. 211-213, 219, 220.
H. Stratman et al., "Membranen in der Verfahrenstechik", pp. 581-596.
W. Pusch et al., "Synthetische Membranen-Herstellung, Struktur und Anwendung", pp. 670-695.

*Primary Examiner*—Ernest G. Therkorn
*Attorney, Agent, or Firm*—Kevin T. Mansfield; Edward McC. Roberts

[57] ABSTRACT

There is disclosed a process for purifying/decolorizing dyeing wastewaters that have been adjusted in a pretreatment step to a pH in the range from 4 to 9 by addition of acid or alkali by means of a membrane separation process. The concentrate obtained after the first step is further decolorized and deionized in the second step. The permeate of the second step is recycled to the pretreatment step, while the permeate of the first step and the concentrated wastewater obtained after the second step are disposed of in conventional manner.

11 Claims, No Drawings

PROCESS FOR PURIFYING DYEING WASTEWATERS

FIELD OF THE INVENTION

The present invention relates to a process for purifying and treating dyeing wastewaters originating from dye synthesis or from the use of dyes in dyeworks and printing works.

DESCRIPTION OF RELATED ART

The treatment of dyeing wastewaters to flocculating agents to precipitate the dyes and subsequent purification by reverse osmosis of the filtrate after removal of the flocculate by filtration is disclosed in U.S. Pat. No. 4,200,526.

SUMMARY OF THE INVENTION

There has now been found a continuous process for purifying and decolorising dyeing wastewaters, which process is carried out in two steps using membranes in each step and by means of which it is possible to achieve effective removal of the dyes and any other components present in the wastewaters and thus, in particular, to decolorise said wastewaters.

Accordingly, the present invention relates to a continuous process for purifying and decolorising dyeing wastewaters that have been standardised in a pretreatment step, which process comprises
(a) subjecting the wastewaters to an initial membrane separation step to obtain a permeate and a concentrate,
(b) subjecting the concentrate to a second membrane separation step to obtain a permeate and a concentrate,
(c) recycling the permeate to the pretreatment step, and
(d) disposing the permeate and the concentrate.

DESCRIPTION OF THE PREFERRED EMBODIMENTS

The above described process steps for the continuous purification and concentration of wastewaters, e.g. those originating from dye manufacture, are set out in more detail below.

Standardisation: The wastewaters, usually from the filter cakes of dye manufacture or e.g. from textile dyeing, are collected in a tank, adjusted to the desired pH with an aqueous solution of an alkali metal hydroxide (e.g. sodium hydroxide solution) or with a mineral acid (e.g. hydrochloric acid), filtered through a coarse filter and heated to the desired temperature before being fed to the membrane separation unit.

In process step (a), the removal in particular of organic substances from the pretreated wastewater is then effected continuously in a first membrane separation unit, whereby the wastewater is substantially decolorised and simultaneously concentrated, i.e. reduced in volume. The succeeding continuous process step (b) comprises the final concentration and additional deionisation of the concentrate obtained in step (a), while the permeate obtained in step (b) is recycled to the pretreatment step (step (c)). Finally (step (d)), the substantially decolorised permeate of step (a) is disposed, i.e. it is fed to a clarification plant, whereas the concentrate of step (b) is subjected to e.g. a wet oxidation.

A very wide range of dyes with respect to shade and chemical constitution may be present in the wastewaters.

The dyes may be present in solution in the wastewaters; but they may also be in the form of aqueous dispersions or suspensions.

Therefore, the dyes may be sparingly soluble or water-insoluble dyes (disperse dyes) or preferably water soluble dyes (acid and basic dyes). These dyes are e.g. metal-free or metal-containing and metallisable monoazo, disazo and polyazo dyes, pyrazolone, thioxathone, oxazine, stilbene and formazan dyes, anthraquinone, nitro, methine, triphenylmethane, xanthone, naphthazarine, styryl, azastyryl, naphthoperinone, quinophthalone and phthalocyanine dyes, as well as dyes of this type which contain at least one fibre-reactive group in the dye molecule.

The water soluble dyes, to which belong e.g. metal complex dyes, chrome dyes, developing dyes, mordant dyes and reactive dyes, usually contain sulfonic acid and/or carboxylic acid groups which may be in the form of free acids or in salt form.

These water-soluble anionic dyes are preferably the alkali salts or ammonium salts of acid wool dyes, of reactive dyes or of substantive cotton dyes of the azo, anthraquinone and phthalocyanine series. Examples of suitable azo dyes are: metal containing or metal-free monoazo and disazo dyes as well as formazan dyes which contain one or more sulfonic acid groups. Anthraquinone dyes are especially 1-amino-4-arylaminoanthraquinone-2-sulfonic acids, and phthalocyanine dyes are in particular sulfonated copper phthalocyanines or phthalocyaninearylamides.

Suitable water soluble metal complex dyes are those containing sulfo or carboxylic groups, e.g. 1:1 or 1:2 metal complexes of azo or azomethine dyes or metallised phthalocyanines, preferably copper and nickel phthalocyanines. Preferred 1:1 or 1:2 metal complexes are 1:1 nickel complexes, 1:1 cobalt complexes, 1:1 copper complexes, 1:1 chromium complexes, 1:2 iron complexes or symmetrical or asymmetrical 1:2 cobalt complexes, 1:2 iron complexes or 1:2 chromium complexes of, in particular, o-carboxy-o'-hydroxyazo dyes, o-hydroxy-o'-aminoazo dyes or o,o'-dihydroxyazo dyes of the benzene-azobenzene, naphthalene-azonaphthalene, benzene-azonaphthalene, benzene-azopyrazolone, benzene-azopyridone or benzene-azoacetoacetamide type, which groupings may be unsubstituted or substituted. Examples of possible substituents are: unsubstituted or substituted sulfamoyl or sulfonyl, halogen or the nitro group.

The copper and nickel phthalocyanines are derived from the customary mixtures with a differing degree of sulfonation.

The reactive dyes contain e.g. heterocyclic groups or acyl groups of carboxylic acids, which groups carry reactive (removable) halogen atoms. The reactive dyes present in the wastewaters to be treated by the process of this invention are also, of course, those whose reactive group has already been removed (by hydrolysis)

The water soluble basic dyes are the customary salts and metal halide double salts, for example zinc chloride double salts, of known cationic dyes, particularly of methine and azamethine dyes, which contain for example: an indolinium, pyrazolium, imidazolium, triazolium, tetrazolium, oxadiazolium, thiodiazolium, oxazolium, thiazolium, pyridinium, pyrimidinium or pyrazinium ring.

The heterocycles can be unsubstituted or substituted and/or condensed with aromatic rings. Also suitable are cationic dyes of the diphenylmethane, triphenylmethane, oxazine, thiazine and 1,2-pyrane series, as well as finally also dye salts of the arylazo and anthraquinone series.

For further details regarding the above mentioned dyes and classes of dyes, reference is made to the Colour Index, 3rd Edition, published by the Society of Dyers and Colorists.

In addition to containing the dyes, the wastewaters, whose pH can be in the acid as well as in the alkaline range, almost always contain acids, e.g. hydrochloric acid or sulfuric acid, or alkaline compounds such as alkali metal hydroxides (NaOH, KOH), ammonia (as ammonium hydroxide), or amines (alkylamines, alkanolamines), as well as salts, in particular halides (chlorides) and sulfates, the typical main representatives of which salts are sodium chloride and sodium sulfate and ammonium chloride and ammonium sulfate; and metal ions of alkali metals other than those mentioned, e.g. polvalent magnesium, copper, zinc, chromium, iron, cobalt and nickel ions.

The wastewaters can also contain dyestuff intermediates and other conventional components such as surfactants, solvents, hydrotropic agents (urea) and the like.

The wastewaters resulting from dye manufacture usually have as a rule a pH of 0.5 to 10. They are treated in a collecting tank with an alkali metal hydroxide solution or a mineral acid and adjusted to a pH in the range from 4 to 9, preferably 5 to 7. The wastewaters are subsequently filtered through a coarse filter.

The temperature of the wastewaters, which should be in the range from at least room temperature (15° to 20° C.) to about 80° C., preferably from 40° to 80° C. and, most preferably, from 40° to 60° C., for carrying out the membrane separation process, is usually reached stepwise, e.g. by means of a heat exchanger and heating with direct steam.

The so treated (standardised) wastewaters are then continuously purified and concentrated by membrane separation methods. In the context of this invention, the term "membrane separation process" will be understood as meaning in particular hyperfiltration. In contradistinction to conventional filtration, in which solid particles are separated from a liquid, this separation process is a selective molecular separation method. The membrane acts as a molecular sieve and is able to retain dissolved substances, if the molecular size is sufficient, on the contact surface of the membrane. It is convenient to use membranes with a cut-off level having a retention of at least 80%, preferably 90%, of the organic substances present in solution in the wastewater. Such membranes are those having a cut-off level in the molecular weight range of 200 to 800, preferably of 200 to 500, and which are symmetrical or asymmetrical. Suitable membranes are finely porous ion exchange or solvent diffusion membranes having pore sizes of about 0.1 to 50 nm, preferably of 0.1 to 10 nm. They permit water and dissolved substances (salts) whose molecular weight is below the cut-off level to pass through under low to medium pressure. However, dyes and other compounds should be retained.

As the membranes employed in the process of this invention preferably contain ionic groups and thus carry anionic and/or cationic charges, the charge carried by the substance to be removed (solute) is also a criterion for the separation effect in addition to its molecular weight. Thus, for example, it is possible to achieve a good separation of polyvalent cations ($Cu^{2\oplus}$, $Co^{2\oplus}$, $Cr^{3\oplus}$), which may be in complex form, from monovalent cations ($Na^{\oplus}$, $K^{\oplus}$).

Concerning the theory and practice of membrane separation processes, reference is made e.g. to H. Strathmann, H. Chmiel, Chem. Ing. Tech. 57, 581 (1985), or to W. Pusch, A. Walch, Angew. Chem. 94, 670 (1982).

Membranes which are particularly suitable for use in the process of this invention are polymeric membranes formed from organic polymers that are chemically modified by radicals containing ionic groups. Suitable polymers for the preparation of the membranes are natural, regenerated or synthetic materials such as cellulose acetates, polyvinyl alcohols, polyacrylonitriles, polyamides, polysulfones, polystyrenes, polyvinyl fluorides, polytetrafluorethylenes or hydrophilised polyolefins.

These basic polymers should contain reactive groups, e.g. hydroxyl, amino, amidoxime and/or haloalkyl (chloromethyl) groups, which are able to react with suitable compounds containing ionic groups to form covalent chemical bonds so as thus to obtain the chemically modified membranes.

Preferred membranes for use in the process of this invention are those made from the following polymers which can be chemically modified as indicated above:

cellulose acetates, e.g. those having a low content of
    acetyl groups, but also higher acylated cellulose, e.g.
    2½-acetate, or
polyvinyl alcohols,
polystyrenes and, preferably
polyacrylonitrile and copolymers of acrylonitrile and
    other monomers having ethylenic unsaturation, and
polysulfones.

Suitable ionic groups present in the membrane-forming polymers or in the membranes are, as anionic groups, e.g. sulfato, carboxylic acid and, preferably, sulfonic acid groups and, as cationic groups, e.g. phosphonium, sulfonium and, preferably, ammonium groups ($—NH_4^{\oplus}$, $—NR_4^{\oplus}$, wherein R=e.g. lower alkyl). Anionic and cationic groups can also be present together in a membrane.

The chemical modification can be effected in one or more steps. Polymers which can be modified in a single step are e.g. cellulose acetates or polyvinyl alcohols that are reacted with reactive ionic compounds which may be colourless or coloured, e.g. reactive dyes of the class of the azo, anthraquinone or formazan dyes, which dyes may also be in the form of metal complexes.

Multi-step chemical modifications for obtaining the membranes which are suitable for use in this invention are made e.g. of membranes based on polyacrylonitrile by reaction with a hydroxylamine, a polyfunctional compound, a polymer and an ionic compound, or of those based on polysulfones by introducing a haloalkyl group into the basic polymer, followed by the reaction with a polymer and an anionic compound.

A multi-step modification of cellulose acetates for the preparation of membranes suitable for use in the process of this invention can be carried out as follows: reaction with a polyfunctional compound, a polymer and an anionic compound.

If desired, it is also possible to use membranes which consist of a basic polymer that is coated with a crosslinked polymer layer. Ionic, at least difunctional, compounds are used as crosslinking agents.

For further details regarding the membranes used in the process of this invention, reference is made to the following patent publications: U.S. Pat. Nos. 4,247,401, 4,477,634, 4,604,204, 4,584,103, European patent applications A-47 953, A-61 424, A-82 355 and A-114 286.

The membranes are conveniently employed in tubular form, with several tubes being comprised in one membrane module.

In detail, the process of this invention is carried out as follows: Wastewaters (filtrates) resulting from dye synthesis, e.g. from filter presses, in which different dyes have been filtered, are collected in a tank. These mixed wastewaters are adjusted with an aqueous solution of an alkali metal hydroxide or with a mineral acid to a pH in the range from 5 to 7, filtered through a coarse filter, pumped into a container by means of a feed pump via a heat exchanger which is operated in countercurrent to warm permeate, and heated with direct steam to a temperature of 40° to 50° C., preferably of 45° to 50° C. By means of a high-pressure pump, the wastewater, which should contain about 10 to 30 g/l of organic compounds and 10 to 220 g/l of salts (e.g. NaCl, $NH_4Cl$ and the like) (total of about 250 g/l of solutes) is pumped to a multistage hyperfiltration unit (reverse osmosis unit) (1). The modules are parallel in each stage and the membrane tubes in each module are connected in series. The hyperfiltration is carried out under a pressure of about 30 to 45 bar.

The flow of permeate through the membrane is about 400 to 1000 $l/m^2d$, e.g. 500 $l/m^2d$. It decreases with increasing dye concentration, as the viscosity of the wastewater to be purified increases. The separation of the first step is complete when the volume concentration of the wastewater is 7- to 15-fold, e.g. 10-fold.

The values for the dye retention are largely independent of the concentration of the wastewater. However, this does not apply to the salt retention (Donnan effect).

The decolorising effect is monitored by measuring the extinction of the permeate. The dye retention is usually higher than 99%. A retention of 75 to 99% of $Cu^{2+}$ and of 85 to 99% of $Cr^{3+}$ was measured.

The virtually colourless permeate of all stages from the hyperfiltration unit is collected and pumped to a clarification plant (wastewater plant) via the heat exchanger referred to above.

The concentrate from is pumped by means of a high-pressure pump to a multi-stage hyperfiltration unit for final concentration and further deionisation. This step is carried out under somewhat lower pressure (e.g. 25 to 35 bar) and slightly higher temperature (e.g. 55° to 80° C.) than in unit. This unit is altogether smaller than the unit, as the volume of the liquid to be processed is smaller. It comprises the same membranes as are also used in unit, although membranes having somewhat larger pores and greater temperature resistance may be used. The modules are parallel, the membrane tubes are connected in series, and each individual stage is provided with a circulation pump and a heat exchanger. The concentrate containing 5 to 20% by weight of organic compounds is fed to the second membrane separation unit. The resultant fairly strongly coloured permeate is recycled to the pretreatment step, while the concentrate, after passage through the second hyperfiltration unit to effect a 20- to 30-fold volume concentration, based on the volume of the starting wastewater, is usually subjected to a wet oxidation or to combustion for further disposal.

The concentrate has approximately the following composition: 20 to 45% by weight of organic compounds, 5 to 15% by weight of TOC (organic carbon), 1 to 10% by weight of (inorganic) salts.

If it is desired to deionise the concentrate more completely, then this can be accomplished by diafiltration by dilution with water in the second membrane separation step.

The following Example illustrates the process of the invention in more detail, without implying any restriction to what is described therein. Parts and percentages are by weight, unless otherwise stated.

The process of this invention, which is carried out continuously, affords good separation (removal of dyes, decolorisation of the wastewater). The two-step procedure keeps an increase in the osmotic pressure within bounds, so that the amount of energy required to carry out the process remains within economic limits. The decrease in the flux rate through the membrane, which can be caused by membrane clogging and which would result in very lengthy treatment times if the wastewater treatment were carried out in a single step, is of virtually no consequence in the two-step procedure.

EXAMPLE

Acid wastwaters from filter presses from the synthesis of reactive, acid and metal complex dyes, are collected in a tank and adjusted to a pH in the range from 4–5 with a 30% aqueous solution of sodium hydroxide. The pretreated wastewater is then filtered through a coarse filter and then pumped to a container by a feed pump via a plate heat exchanger, which is operated in countercurrent with warm permeate, and further heated with steam to a temperature of 45° C. The wastewater, has a maximum organic carbon (TOC) concentration of 10 g/l and a maximum salt concentration of 160 g/l, is pumped continuously from the feed container by a high-pressure pump to the 7-stage hyperfiltration unit, each stage of which is equipped with 46 single modules having a membrane surface area of 120 $m^2$ (chemically modified polyacrylonitrile membranes prepared in accordance with U.S. Pat. No. 4,584,103). Within the stages the modules are parallel, all 18 tubes of a module are connected in series, and each individual stage is provided with a circulation pump. The circulation pump produces the flow rate necessary for the modules, whereas the high-pressure pump ensures the rise in pressure of 40 bar and pumps solution into the system commensurate with the amount of concentrate and permeate that flows off. The circulation pumps have only to overcome the loss in pressure of 4 to 8 bar of the individual modules.

The operating pressure of the entire unit is adjusted by means of a by-pass control valve downstream of the high-pressure pump. The discharge of concentrate is controlled by a ratio control means (feed:discharge), so that a certain amount of concentrate always flows off. The risk of the concentrate becoming overconcentrated is greatly diminished by this expedient.

The rate of permeation through the membrane is about 500 $l/m^2d$. It decreases sharply with increasing dye concentration. The separation method of step 1 is discontinued when the volume concentration of the waste water is approximately 10-fold. The values for the dye retention are substantially independent of the concentration of the wastewater. However, this does not apply to the salt retention (Donnan effect).

The decolorisation effect is monitored by measuring the extinction of the permeate. The dye retention is usually higher than 99%. A 75 to 99% retention of $Cu^{2\oplus}$ and an 85 to 99% retention of $Cr^{3\oplus}$ was measured.

The almost colourless permeate from all stages of the hyperfiltration unit is collected and pumped by a feed pump via a heat exchanger to a wastewater plant.

The concentrate flows into a neutralisation tank and is then pumped by a high-pressure pump into a 4-stage hyperfiltration unit for final concentrating and further removal of organic compounds as well as for further deionisation. Each stage has a membrane surface area of 45 m² (membrane as described) and is equipped with 18 individual modules. Within each stage the modules are parallel and each individual stage is provided with a circulation pump and a heat exchanger. The control means is analogous to that of unit. In this case, however, the fairly strongly coloured permeate is recycled to the pretreatment tank and the concentrate (composition as above) is temporarily stored in a tank before being further transported to e.g. a wet oxidation unit. In both hyperfiltration units, the stages are connected randomly to a distribution line such that the concentration increases from stage to stage over the entire length of said distribution line. The insertion of restrictions into these lines strongly reduces the backmixing of the flow of concentrate.

Each stage, without interruption of the continuous operation, can be prerinsed with permeate by means of a purifying system, then rinsed with warm demineralised water or, if necesary, subjected to chemical purification.

What is claimed is:

1. A continuous process for purifying dye-containing wastewaters originating from dye synthesis or from the use of dyes in dyeing and printing after a pretreatment step which comprises adjusting the pH to a value in the range of from 4 to 9, coarse filtering to remove suspended solids and adjusting the temperature to a value between 15° and 80° C., which process comprises
   (a) subjecting the watewater to an initial membrane separation step to obtain a permeate and a concentrate,
   (b) subjecting the concentrate to a second membrane separation step to obtain a permeate and a concentrate,
   (c) recycling the permeate to said pretreatment step, and
   (d) discharging the permeate to a conventional waste water plant and disposing of the concentrate in a manner conventional for concentrated aqueous organic waste, and wherein both membrane separation steps are carried out under a pressure in the range from 10 to 80 bar.

2. A process according to claim 1, wherein the membrane separation steps are hyperfiltrations.

3. A process according to claim 1, wherein the membrane separation steps are carried out with unmodified or chemically modified polymer membranes.

4. A process according to claim 1, wherein the membranes are polymer membranes selected from chemically modified cellulose acetate, polyvinyl alcohol, polystyrene polyacrylonitrile or polysulfone membranes, and the chemical modification consists in the introduction of anionic and/or cationic groups into said membranes.

5. A process according to claim 4, wherein the polymer membranes are chemically modified polyacrylonitrile or polysulfone membranes.

6. A process according to claim 1, wherein both membrane separation steps are carried out under a pressure in the range from 20 to 50 bar.

7. A process according to claim 6, wherein said initial membrane separation step is carried out under a pressure of 30 to 45 bar, and said second membrane separation step is caried out under a pressure of 25 to 30 bar.

8. A process according to claim 1, wherein the permeate is purified by treatment in a conventional waste water plant and the concentrate is disposed of by wet oxidation or combustion.

9. A process according to claim 1, wherein a 7- to 15-fold volume concentration is obtained after the first membrane separation step and a 20- to 30-fold volume concentration after both steps, based on the starting pretreated wastewater.

10. A process according to claim 1, wherein the temperature of the wastewaters is in the range from 40° to 80° C.

11. A process according to claim 10, wherein the temperature of the wastewaters is in the range from 40° to 60° C.

* * * * *

UNITED STATES PATENT AND TRADEMARK OFFICE
CERTIFICATE OF CORRECTION

PATENT NO. : 4,758,347
DATED : July 19, 1988
INVENTOR(S) : Henz et al.

It is certified that error appears in the above—identified patent and that said Letters Patent is hereby corrected as shown below:

Claim 1 should read as follows:

Line 9 after "permeate" insert --(1)--.

Lines 9 and 10 after "concentrate" insert --(1)--.

Line 11 after "concentrate" insert --(1)--.

Line 12 after "permeate" insert --(2)--.

Lines 12 and 13 after "concentrate" insert --(2)--.

Line 14 after "permeate" insert --(2)--.

Line 16 after "permeate" insert --(1)--.

Line 17 after "concentrate" insert --(2)--.

Signed and Sealed this

Second Day of January, 1990

Attest:

JEFFREY M. SAMUELS

Attesting Officer

Acting Commissioner of Patents and Trademarks